(12) United States Patent
Greenhalgh et al.

(10) Patent No.: US 11,803,388 B2
(45) Date of Patent: Oct. 31, 2023

(54) APPARATUS AND METHOD FOR PREDICTING SOURCE OPERAND VALUES AND OPTIMIZED PROCESSING OF INSTRUCTIONS

(71) Applicant: Arm Limited, Cambridge (GB)

(72) Inventors: Peter Richard Greenhalgh, Cambridge (GB); Frederic Claude Marie Piry, Alpes Maritimes (FR); Ian Michael Caulfield, Cambridge (GB); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 207 days.

(21) Appl. No.: 17/266,759

(22) PCT Filed: Jul. 17, 2019

(86) PCT No.: PCT/GB2019/051999
§ 371 (c)(1),
(2) Date: Feb. 8, 2021

(87) PCT Pub. No.: WO2020/065250
PCT Pub. Date: Apr. 2, 2020

(65) Prior Publication Data
US 2021/0311742 A1    Oct. 7, 2021

(30) Foreign Application Priority Data

Sep. 26, 2018  (GB) ...................... 1815654

(51) Int. Cl.
*G06F 9/38* (2018.01)
*G06F 9/30* (2018.01)
(52) U.S. Cl.
CPC ........ *G06F 9/3832* (2013.01); *G06F 9/30098* (2013.01); *G06F 9/3836* (2013.01)

(58) Field of Classification Search
CPC ... G06F 9/3832; G06F 9/30098; G06F 9/3836
See application file for complete search history.

(56) References Cited

U.S. PATENT DOCUMENTS 6,505,293 B1    1/2003  Jourdan et al.
7,222,226 B1    5/2007  Lepak et al.
(Continued)

FOREIGN PATENT DOCUMENTS

GB      2525264      10/2015

OTHER PUBLICATIONS

International Search Report and Written Opinion of the ISA for PCT/GB2019/051999, dated Oct. 18, 2019, 27 pages.
(Continued)

*Primary Examiner* — Michael J Metzger
(74) *Attorney, Agent, or Firm* — NIXON & VANDERHYE P.C.

(57) ABSTRACT

An apparatus and method are provided for processing instructions. The apparatus has execution circuitry for executing instructions, where each instruction requires an associated operation to be performed using one or more source operand values in order to produce a result value. Issue circuitry is used to maintain a record of pending instructions awaiting execution by the execution circuitry, and prediction circuitry is used to produce a predicted source operand value for a chosen pending instruction. Optimisation circuitry is then arranged to detect an optimisation condition for the chosen pending instruction when the predicted source operand value is such that, having regard to the associated operation for the chosen pending instruction, the result value is known without performing the associated operation. In response to detection of the optimisation condition, an optimisation operation is implemented instead of causing the execution circuitry to perform the associated
(Continued)

operation in order to execute the chosen pending instruction. This can lead to significant performance and/or power consumption improvements.

20 Claims, 9 Drawing Sheets

(56) References Cited

U.S. PATENT DOCUMENTS

| | | | |
|---|---|---|---|
| 7,788,473 | B1 | 8/2010 | Nelson et al. |
| 2002/0087850 | A1 | 7/2002 | Jourdan et al. |
| 2002/0138236 | A1* | 9/2002 | Takamura ............. G06F 9/3848 702/186 |
| 2005/0027964 | A1 | 2/2005 | Sperber et al. |
| 2007/0174555 | A1 | 7/2007 | Burtscher et al. |
| 2010/0050164 | A1* | 2/2010 | Van De Waerdt ........ G06F 8/45 712/205 |
| 2012/0191957 | A1 | 7/2012 | Gonion |
| 2013/0339671 | A1* | 12/2013 | Williams, III ........ G06F 9/3887 |
| 2015/0106600 | A1 | 4/2015 | Gschwind |
| 2016/0139933 | A1 | 5/2016 | Srikantaiah |
| 2016/0371093 | A1* | 12/2016 | Chang ................... G06F 9/3887 |
| 2017/0075689 | A1* | 3/2017 | Branscome ........... G06F 9/3887 |
| 2018/0246723 | A1 | 8/2018 | Prasky et al. |

OTHER PUBLICATIONS

Combined Search and Examination Report for GB1815654.7, dated Mar. 12, 2019, 6 pages.

Islam et al., "Reduction of Energy Consumption in Processors by Early Detection and Bypassing of Trivial Operations", Embedded Computer Systems: Architectures, Modeling and Simulation, 2006 International Conference, Jul. 1, 2006, pp. 28-34.

Tran et al., "Dynamically reducing pressure on the physical register file through simple register sharing", Performance Analysis of Systems and Software, 2004 IEEE International Symposium on— ISPASS, Mar. 10-12, 2004, pp. 78-88.

Examination Report for GB Application No. 1815654.7 dated Mar. 19, 2021, 2 pages.

* cited by examiner

PREDICTION TABLE 65

| ARCHITECTURAL REGISTER 105 | HISTORY OF VALUES 110 | PREDICTED VALUE 115 | CONFIDENCE 120 |
|---|---|---|---|
| R0 | Va Vb Vc .... | Vpred. | CONFIDENCE VALUE |
| R1 | | | |
| ------ | ------ | ------ | ------ |
| | | | |
| | | | |

FIG. 2

COMMITTING OF KNOWN RESULT
VALUE (STEP 210 IN FIG. 4) FOR INO SYSTEM

CAUSE EXECUTE STAGE TO WRITE KNOWN RESULT VALUE TO REGISTER IDENTIFIED BY DESTINATION REGISTER IDENTIFIER WITHOUT EXECUTING THE INSTRUCTION — 220

FIG. 5A

COMMITTING OF KNOWN RESULT
VALUE (STEP 210 IN FIG. 4) FOR OOO SYSTEM

CAUSE REGISTER RENAME CIRCUITRY TO PERFORM REMAPPING SO THAT ARCHITECTURAL REGISTER IDENTIFIED BY DESTINATION REGISTER IDENTIFIER IS MAPPED TO A PHYSICAL REGISTER CONTAINING THE KNOWN RESULT VALUE — 225

FIG. 5B

EXAMPLES

MUL   R1,   R3,   R7

→ PREDICT   R3 = 0

→   CAN MAP R1 TO 0 (COMMIT ONCE R3 KNOWN TO BE 0)

FIG. 8A

ADD/SUB   R1,   R2,   R3

→ PREDICT   R3 = 0

→   CAN MAP R1 TO R2 (COMMIT ONCE R3 KNOWN TO BE 0)

FIG. 8B

MAC   R1,   R2,   R3

→ PREDICT   R2 = 0

→   NO UPDATE TO R1 NEEDED (CONFIRMED ONCE R2 KNOWN TO BE 0)

FIG. 8C

MUL   R1,   R2,   R4

→ PREDICT   R2 = 1

→   CAN MAP R1 TO R4 (COMMIT ONCE R2 KNOWN TO BE 1)

FIG. 8D

APPARATUS AND METHOD FOR PREDICTING SOURCE OPERAND VALUES AND OPTIMIZED PROCESSING OF INSTRUCTIONS

This application is the U.S. national phase of International Application No. PCT/GB2019/051999 filed 17 Jul. 2019, which designated the U.S. and claims priority to GB Patent Application No. 1815654.7 filed 26 Sep. 2018, the entire contents of each of which are hereby incorporated by reference.

The present technique relates to an apparatus and method for processing instructions. A data processing apparatus will typically provide execution circuitry that is used to execute a sequence of instructions, where each instruction may require an associated operation to be performed using one or more source operand values in order to produce a result value. Before the execution circuitry can execute a particular instruction, it is necessary for the source operand values for that instruction to be available. It may for example be the case that one or more of the source operand values required for a particular instruction are produced as result values of other earlier instructions. In such a situation, it would typically be necessary to wait for any such result value to be produced, before the above mentioned particular instruction is considered to have its source operand values available, and hence can be dispatched to the execution circuitry.

In order to seek to improve performance, some systems provide value prediction circuitry that is used to produce a predicted source operand value for one or more instructions. Based on such a predicted source operand value, the instruction can then be issued to the execution circuitry (provided any other required source operand values are also available), which can lead to an increase in performance in situations where the predicted source operand value is correct. In due course, a determination can be made as to whether the predicted source operand value is correct and if not the state of the processing system can be rewound to a point prior to use being made of the predicted source operand value, with any affected instructions being re-executed taking into account the actual source operand value.

It would be desirable to further improve the performance benefits available within a system employing value prediction.

In one example arrangement, there is provided an apparatus comprising: execution circuitry to execute instructions, each instruction requiring an associated operation to be performed using one or more source operand values in order to produce a result value; issue circuitry to maintain a record of pending instructions awaiting execution by the execution circuitry; prediction circuitry to produce a predicted source operand value for a chosen pending instruction; and optimization circuitry to detect an optimization condition for the chosen pending instruction when the predicted source operand value is such that, having regard to the associated operation for the chosen pending instruction, the result value is known without performing the associated operation; wherein the optimization circuitry is arranged in response to detection of the optimization condition to implement an optimization operation instead of causing the execution circuitry to perform the associated operation in order to execute the chosen pending instruction.

In another example arrangement, there is provided a method of processing instructions comprising: providing execution circuitry to execute the instructions, each instruction requiring an associated operation to be performed using one or more source operand values in order to produce a result value; maintaining a record of pending instructions awaiting execution by the execution circuitry; employing prediction circuitry to produce a predicted source operand value for a chosen pending instruction; detecting an optimization condition for the chosen pending instruction when the predicted source operand value is such that, having regard to the associated operation for the chosen pending instruction, the result value is known without performing the associated operation; and in response to detection of the optimization condition, implementing an optimization operation instead of causing the execution circuitry to perform the associated operation in order to execute the chosen pending instruction.

In a still further example arrangement, there is provided an apparatus comprising: execution means for executing instructions, each instruction requiring an associated operation to be performed using one or more source operand values in order to produce a result value; issue means for maintaining a record of pending instructions awaiting execution by the execution means; prediction means for producing a predicted source operand value for a chosen pending instruction; and optimization means for detecting an optimization condition for the chosen pending instruction when the predicted source operand value is such that, having regard to the associated operation for the chosen pending instruction, the result value is known without performing the associated operation; wherein the optimization means is arranged in response to detection of the optimization condition to implement an optimization operation instead of causing the execution means to perform the associated operation in order to execute the chosen pending instruction.

The present technique will be described further, by way of illustration only, with reference to examples thereof as illustrated in the accompanying drawings, in which:

FIG. 1 is a block diagram of a data processing apparatus in accordance with one example configuration;

FIG. 2 schematically illustrates information that may be maintained within the prediction table of FIG. 1 in one example arrangement;

FIG. 5A illustrates how step 210 of FIG. 4 may be implemented in one example arrangement, for an in-order data processing arrangement;

FIG. 5B illustrates how step 210 of FIG. 4 may be implemented in one example arrangement, for an out-of-order data processing arrangement;

FIGS. 8A to 8D illustrate various example situations in which the optimisation technique described herein can be utilised.

Figure 1:
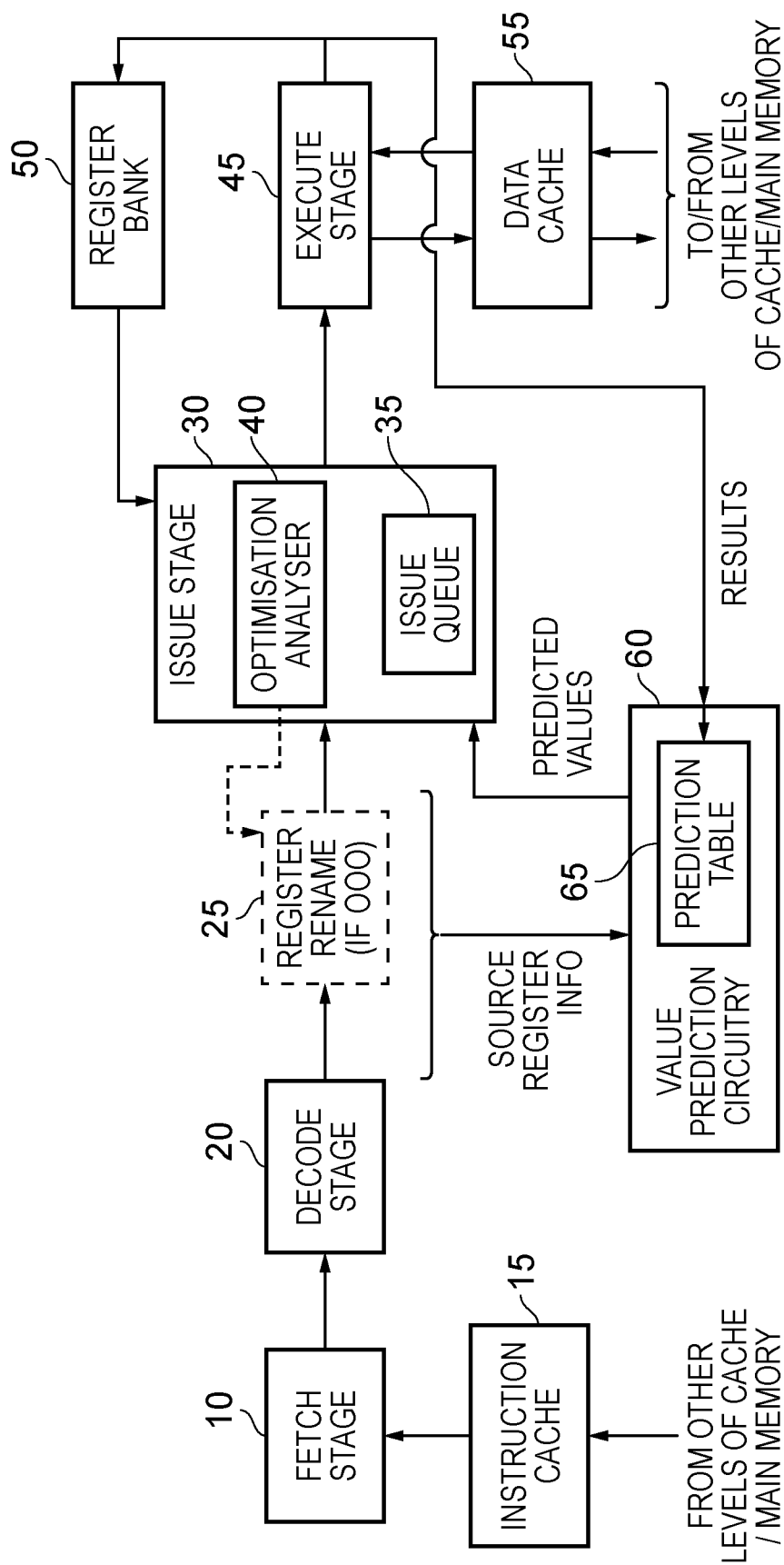

In one example arrangement, an apparatus is provided that has execution circuitry for executing instructions, where each instruction requires an associated operation to be performed using one or more source operand values in order to produce a result value. Issue circuitry is used to maintain a record of pending instructions awaiting execution by the execution circuitry. In addition, prediction circuitry is provided to produce a predicted source operand value for a chosen pending instruction. As mentioned earlier, through the provision of a predicted source operand value, it is possible that the chosen pending instruction may be available for execution sooner than would otherwise be the case if it had to await the availability of the actual source operand value.

However, in accordance with the techniques described herein, further performance and/or power consumption benefits can be realised in certain situations, dependent on the form of the predicted source operand value and the associated operation that needs to be performed for the chosen pending instruction. In particular, the apparatus has optimisation circuitry that is arranged to detect an optimisation condition for the chosen pending instruction when the predicted source operand value is such that, having regards to the associated operation for the chosen pending instruction, the result value is known without performing the associated operation. In response to detection of the optimisation condition, the optimisation circuitry is arranged to implement an optimisation operation instead of causing the execution circuitry to perform the associated operation in order to execute the chosen pending instruction. Hence, in the presence of the optimisation condition being detected, it can be determined that there is no need to execute the chosen pending instruction in order to produce the result value for that chosen pending instruction, which can give rise to significant performance and/or power consumption benefits. In particular, since the chosen pending instruction does not need to be executed, this frees up resources within the execution circuitry to execute other instructions, thereby improving performance. Further, this can give rise to power consumption savings, by virtue of the result value being determined without needing to execute the chosen pending instruction in the execution circuitry.

Additional benefits can also then be realised in respect of any dependent instructions within the issue queue. In particular, the optimisation circuitry may be arranged to identify a dependent instruction in the issue queue that uses as a source operand the result value for the chosen pending instruction. Since, in the presence of the optimisation condition, the result value is known without performing the associated operation, then the relevant source operand for the dependent instruction can also be identified as being known, i.e. being the known result value, such that the issue circuitry will then consider that source operand to be available for the dependent instruction. This may allow the dependent instruction to be dispatched to the execution circuitry for execution earlier than would otherwise have been the case, had the apparatus had to await execution of the chosen pending instruction in order to produce the result value.

Hence, it will be seen that the above described technique enables the result value for the chosen pending instruction to be determined based on the speculation made using the predicted source operand value, and in addition can allow that result value to then be used as source operands in connection with any dependent instructions within the issue queue. This enables an enhanced level of speculation to be performed based on the predicted source operand value, which can lead to significantly increased performance in situations where the predicted source operand value is correct. As discussed earlier, in situations where in due course it is determined that the predicted source operand value was not correct, then standard replay mechanisms can be used to rewind the state of the processing apparatus to the appropriate point in the instruction stream, with the affected instructions then being re-executed using the actual source operand value.

In one example arrangement, the chosen pending instruction provides a destination register identifier, and the optimization operation comprises committing the known result value to a register determined from the destination register identifier once the predicted source operand value is determined to be correct. Hence, whilst an enhanced level of speculation can be achieved using the technique described above in the presence of the optimisation condition, the result value is not actually committed (i.e. the architectural state of the system is not updated) until the predicted source operand's value is determined to be correct. However, at that point the known result value that was determined taking into account the predicted source operand value and the associated operation for the chosen pending instruction, can be committed without needing to execute the chosen pending instruction in order to determine the result value.

There are a number of ways in which the predicted source operand value can be determined to be correct. In one example arrangement, each instruction is arranged to identify the one or more source operand values by providing associated source register identifiers, and the chosen pending instruction provides a source register identifier for the source operand value predicted by the prediction circuitry that is the destination register identifier for an earlier instruction in a sequence of instructions to be executed by the execution circuitry. In such a situation, the predicted source operand value for the chosen pending instruction may be determined to be correct once the result value has been determined for the earlier instruction and is determined to match the predicted source operand value. Standard speculation checking mechanisms can thus be used to determine whether the predicted source operand value is or is not correct. In instances where the predicted source operand value is determined to be correct, then the performance benefits obtained from the enhanced speculation discussed earlier (where speculation is performed not only based on the predicted source operand value, but also based on a determination by the optimisation circuitry that the result value is known without executing the chosen pending instruction) can be realised.

The above described optimisation technique can be employed in a wide variety of different systems. For example, the technique can be applied in an in-order processor arrangement, where the instructions are executed in original program order, or in an out-of-order processor arrangement where instructions are allowed to be executed out-of-order with respect to original program order.

Within an in-order arrangement, the optimisation circuitry may be arranged to implement the optimisation operation by causing the execution circuitry to write the known result value to the register determined from the destination register identifier. As discussed earlier, this will occur once the predicted source operand value is determined to be correct, and hence it is safe to update the architectural state of the system by writing the known result value to the relevant register.

Within an out-of-order arrangement, there may be no requirement to write the known result value to a register at the commit point. In particular, where the apparatus supports speculative execution of the instructions by the execute circuitry out-of-order with respect to original program order of the instructions, the apparatus may further comprise register rename circuitry to map architectural registers identified by register identifiers in instructions to physical registers within a set of physical registers, where the number of physical registers exceeds the number of architectural registers. As will be understood by those of ordinary skill in the art, register renaming is a technique that can eliminate false data dependencies arising from the reuse of architectural registers by successive instructions that do not have any real data dependencies between them. The elimination of such false data dependencies can reveal more instruction-level parallelism in an instruction stream which can then be exploited to improve performance. Through use of the larger set of physical registers, and the register renaming technique, multiple versions of the same architectural register can exist at the same time.

Within such a system, rather than writing to a register at the commit point, the optimisation circuitry may be arranged to implement the optimisation operation by causing the register rename circuitry to perform a remapping so that the architectural register identified by the destination register identifier is mapped to a physical register containing the known result value.

Whilst such a remapping can only be committed once the predicted source operand value is determined to be correct, in one example arrangement the optimisation circuitry may be arranged to speculatively perform the remapping before the predicted source operand value is determined to be correct, and to then commit the remapping when the predicted source operand value has been determined to be correct. A number of techniques can be used to distinguish between speculative remappings and committed remappings. For example, different remapping tables may be used for speculative remappings and committed remappings, or alternatively an additional field may be provided in association with each remapping to identify whether it is a speculative remapping or a committed remapping. By speculatively performing the remapping, this further improves the performance benefits that can be realised, for example by enabling dependent instructions to be executed using the speculative remapping.

Hence, in one example arrangement, the remapping may be used to trigger a further optimization operation for at least one dependent instruction that uses as a source operand the result value for the chosen pending instruction.

The dependent instructions that can be subjected to the further optimisation operation can take a variety of forms. However, as a specific example, the at least one dependent instruction may be a move instruction identifying as a source operand the result value for the chosen pending instruction, and the further optimization operation causes the register rename circuitry to perform a further remapping so that the architectural register identified by a destination register identifier for the move instruction is also mapped to the physical register containing the known result value.

Hence, it will be appreciated that in such a situation not only does the chosen pending instruction not need to be executed, but also the dependent instruction does not need to be executed since in both instances the result of the instruction is known provided the predicted source operand value is correct. This can lead to significant performance improvements when executing a stream of instructions.

There are a variety of situations in which the optimisation circuitry may detect presence of the optimisation condition based on the predicted source operand value and the associated operation for the chosen pending instruction. In one example arrangement, the associated operation for the chosen pending instruction operates on a plurality of source operand values, and the associated operation is such that the known result value is given by one of the source operand values when the predicted source operand value is a predetermined value. Hence, in such an arrangement, that known result value can be derived directly from one of the source operand values.

The predetermined value of the predicted source operand may vary dependent on implementation, but in one example arrangement the predetermined value is 0. Hence, in such a situation, the optimisation circuitry can be arranged, when the predicted source operand value is 0, to determine based on the associated operation for the chosen pending instruction, whether the result value is known without performing the associated operation.

There are a variety of different forms of instruction where this may be the case. For example, the chosen pending instruction may be a multiply instruction, in which event the known result value is 0 when the predicted source operand value is 0. In particular, once it is known that one of the source operands for the multiply instruction is 0, then the result value will be 0 irrespective of the value of the other source operand.

As another example, the chosen pending instruction may be a multiply-accumulate instruction, requiring first and second source operands to be multiplied together to form an intermediate result which is then added to an accumulate source operand. When the predicted source operand value is zero for one of the first and second source operands, the known result value will be provided by the accumulate source operand. Hence, in such a situation, it is known that there will be no change to the accumulate source operand value when performing the multiply-accumulate operation, and hence the known result value can be provided directly by the accumulate source operand.

In implementations where the destination register identifier is specified separately to the source register identifier for the accumulate source operand, then the architectural state associated with the register determined from the destination register identifier can be updated (either by writing to the destination register or through a remapping within the register rename circuitry) to identify that register's contents as being the accumulate source operand value, once it is known that the predicted source operand value is correct. However, in some implementations the destination register identifier is also the source operand identifier for the accumulate source operand. Such a form of encoding is commonly used, as it provides an efficient encoding for a multiply-accumulate instruction. In such instances, the committing of the known result value to the register determined from the destination register identifier merely comprises leaving the content of that register unchanged. Hence, at the commit point, no writing to the destination register, or update of the register renaming table, is required.

As another example, the chosen pending instruction may be an add or subtract instruction operating on first and second operands, and the predicted source operand value may be 0 for one of the first and second operands. In that event, the known result value is determined from the value of the other one of the first and second operands. For add instructions, the known result value will be given directly by the value of the other one of the first and second operands, as indeed will be the case for a subtraction operation A-B where operand B is predicted as 0. Further, in situations of a subtract instruction where operand A is predicted as 0, it will be appreciated that the result value "−B" can still efficiently be determined from the other operand B without needing to perform the subtraction operation, for example it may merely involve flipping the sign bit.

Whilst in the above described examples the optimisation circuitry looks for the presence of the optimisation condition in situations where the predicted source operand value is 0, the technique can also be used when the predicted source operand value has a different value. For example, the predicted source operand value may be 1.

In one such example, the chosen pending instruction may be a multiply instruction operating on first and second operands. In situations where the predicted source operand value is 1 for one of the first and second operands, then the known result value is given by the value of the other one of the first and second operands.

The above described techniques can be used in scalar processing circuits, or also in vector processing circuits. For example, the execute circuitry may be arranged to perform vector processing operations in a plurality of lanes of parallel processing, and the optimization circuitry may be arranged to assess presence of the optimization condition for each lane, so as to enable the optimization operation to be applied for any lane where the predicted source operand value for that lane is such that, having regard to the associated operation for the chosen pending instruction, the result value for that lane is known without performing the associated operation. This provides a flexible and efficient mechanism for achieving the earlier-described performance and/or power benefits when the optimisation condition is detected in one or more lanes of parallel processing within the execute circuitry.

Particular examples will now be described with reference to the Figures.

FIG. 1 is a block diagram illustrating a data processing apparatus in accordance with one example implementation. A fetch stage 10 is used to fetch instructions identified by fetch addresses from the instruction cache 15. The fetch stage may be coupled to branch prediction circuitry for predicting the outcome of branch instructions, and based on that prediction generating a series of fetch addresses of instructions to be fetched by the fetch stage 10.

A decode stage 20 decodes the fetched instructions to generate control information for controlling the subsequent stages of the pipeline. Such generated control information may also be referred to herein as decoded instructions.

In an in-order processing system, the decoded instructions generated by the decode stage 20 may be routed directly to the issue stage 30, which provides an issue queue 35 in which the decoded instructions are stored whilst they are pending instructions awaiting execution by the execute stage 45. However, in an out-of-order system, a register rename stage 25 may additionally be provided for performing register renaming to remap architectural register specifiers identified by the instructions to physical register specifiers identifying registers within the register bank 50 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the instruction cache 15, which can improve performance by allowing a later instruction to execute while an earlier instruction is waiting for an operand to become available. The ability to map architectural registers to different physical registers can also facilitate the rolling back of architectural state in the event of a branch misprediction.

Following register renaming, the decoded instruction information can be stored in the issue queue 35 of the issue stage 30, or as discussed earlier, in the event of an in-order system that does not use register renaming, the decoded instruction information from the decode stage 20 can be provided directly to the issue stage 30 for storing in the issue queue 35.

The issue stage 30 queues instructions awaiting execution until the required source operands for processing those instructions are available. For example, a source operand value for a particular instruction may be produced as a result value from an earlier instruction being executed in the execute stage, and once that result value becomes available from the execute stage, either by being written into the appropriate register in the register bank 50, or being forwarded over a forwarding path, then that particular instruction can be issued from the issue queue, provided any other source operands are also available. The execute stage 45 executes the instructions to carry out corresponding processing operations, whereafter the results can be output from the execute stage for writing into the register bank 50.

The execute stage may include a number of execution units such as a branch unit for evaluating whether branch instructions have been correctly predicted, an ALU (arithmetic logic unit) for performing arithmetic logical operations, a floating-point unit for performing operations using floating-point operands and a load/store unit for performing load operations to load data from a memory system to the registers of the register bank 50 or store operations to store data from the registers of the register bank 50 to the memory system.

In the illustrated example, the memory system includes a level one instruction cache 15, a level one data cache 55, and one or more additional levels of cache between the level one instruction cache and level one data cache and main memory, these additional levels of cache and the main memory being omitted from FIG. 1.

A pending instruction in the issue queue 35 can be issued to the execute stage 45 once its source operands are available. In order to allow for potential earlier execution of instructions, value prediction circuitry 60 may be provided that maintains a prediction table 65 that seeks to maintain a predicted value for one or more of the architectural registers that may be specified by instructions. There are various ways in which the prediction table can be organised and maintained, with the aim of seeking to provide a predicted value for an architectural register with a desired level of confidence.

FIG. 2 illustrates one example arrangement of the prediction table 65, that comprises a plurality of entries 100, one entry being provided for each architectural register that may be specified by the instructions. In an in-order (INTO) system, these architectural registers will also directly correspond to individual physical registers within the register bank 50. However, in an out-of-order (OOO) system there will be a larger number of physical registers within the register bank 50, and the register rename stage 25 is used to maintain a mapping between the architectural registers and the physical registers of the register bank 50. In either implementation, the prediction table can be used to seek to predict values for particular architectural registers. In one example arrangement, this can be achieved by seeking to maintain a history of values observed via the results provided from the execute stage, for each of the architectural registers.

Each entry 100 contains four fields in the example of FIG. 2. A first field 105 is used to identify the architectural register, whilst the second field 110 is used to maintain a history of result values produced by the execute stage for that architectural register. A predicted value field 115 is then used to maintain a predicted value for that architectural register, which can be determined based on an analysis of the history of values in the field 110. Finally, a confidence field 120 is used to provide a confidence value indicating a level of confidence in the predicted value within the predicted value field 115. In one example implementation, the value prediction circuitry 60 will only begin to make predictions using the predicted value for an architectural register once the associated confidence value has reached a predetermined threshold indicative of an associated level of accuracy in the predicted value.

Considering the entry 100 as maintained for architectural register R0 as an example, then as shown in FIG. 2 the history of values may indicate the values $V_a$, $V_b$, $V_c$, etc., with the value prediction circuitry seeking to predict any pattern in the observed history of values, and based thereon to provide a predicted value. A confidence indication can also be maintained to indicate a level of confidence in the predicted value. For example, if a regular pattern is observed in the history of values, extension of that regular pattern may be used to produce a predicted value. When the next result is determined for that architectural register, if that matches the predicted value, then the confidence value can be adjusted to indicate an increased confidence in the prediction. At the same time, the predicted value may be updated based on the pattern. This process can be continued until such time that the level of confidence indicated by the confidence value has reached a chosen threshold level, whereafter for subsequent occurrences of the register R0 being used as a source operand, the value prediction circuitry can output the current predicted value for that register to the issue stage 30.

For an in-order system, the output from the value prediction circuitry may merely identify the architectural register and the predicted value for that architectural register. However, for an out-of-order system, the output from the value prediction circuitry will also use information obtained from the register rename stage, so as to be able to identify the physical register for which the predicted source operand value is provided. The issue queue will maintain a list of pending instructions, and indications of the source operand identifiers for the source operands required for each of those instructions. For an in-order system, those source operand identifiers may identify the architectural register that will provide the source operand value, whilst for an out-of-order system those source operand identifiers may identify the physical register for each source operand as provided by the output from the register rename stage 25.

When a predicted source operand value is provided from the value prediction circuitry, the issue stage 30 can then update the information maintained in the issue queue, so that any instruction that is awaiting that source operand value can be marked as having that source operand available. In particular, at this point the predicted source operand value can be used as the source operand value without needing to wait for the actual source operand value to become available. This can allow an instruction to be available for issuance from the issue stage 30 to the execute stage 45 earlier than would otherwise be the case, hence enabling an increase in performance.

In addition, in accordance with the techniques described herein, when a predicted source operand value takes a particular value, the issue stage can employ an optimisation analyser 40 to seek to determine whether an optimisation condition is present for an instruction that will use the predicted source operand value. In particular, the optimisation analyser 40 (which may also be referred to herein as optimisation circuitry) is arranged to detect an optimisation condition for a particular pending instruction when a predicted source operand value used by that instruction is such that, having regard to the associated operation for that particular pending instruction, the result value is known without performing the associated operation. In the presence of the optimisation condition being detected, the issue stage 30 can be arranged such that, when it is determined to execute that particular pending instruction, the instruction is not actually executed by the execute stage 45, and instead the known result value is used directly without executing the instruction in order to perform the associated operation.

Accordingly, performance is improved by avoiding the need to execute the instruction in the presence of the optimisation condition being detected, thereby freeing up the resources of the execute stage 45 for performing other operations. In addition, power consumption benefit can be realised, due to avoiding the need to employ the execute stage to execute that particular instruction.

The described technique hence enables an enhanced level of speculation to be achieved based on the predicted source operand value. In particular, not only is the predicted source operand value itself used as a mechanism for speculation, by making certain predicted source operand values available before the actual source operands have been produced, but in the presence of the optimisation condition, the result value for certain instructions can be directly determined from the predicted source operand without actually executing the instructions. In some instances those result values can themselves then be used to further increase the level of speculation performed, for example by identifying any dependent instructions in the issue queue that use such a result value as a source operand, and also marking those instructions as having that source operand available. This can provide significant benefits in situations where the predicted source operand value is correct. As discussed earlier, since the predictions are only made once the value prediction circuitry has a required level of confidence in the prediction, then the accuracy of the predicted source operand values can reach a level where significant performance benefits are realised through use of the above described optimisation technique.

In situations where the speculation of the predicted source operand value proves to be incorrect, then a rollback mechanism can be implemented to return the state of the processing pipeline to a point prior to the predicted source operand value being used, and then replaying the affected instructions using the actual source operand value.

As the actual result values are produced from the execute stage 45, then the contents of the prediction table 65 can be updated. In an in-order system, the result information will identify the architectural register and the result, allowing the prediction table to be updated directly. For out-of-order systems, the execute stage may identify the physical register and the result, and then with reference to the remapping that was performed by the register rename circuitry 25, the relevant architectural register can be identified within the prediction table, and the contents of that entry updated.

When the optimisation analyser determines presence of the optimisation condition for a chosen pending instruction in the issue queue 35, then the optimisation operation performed may comprise committing the known result value to a register determined from the destination register identifier specified by the chosen pending instruction once the predicted source operand value is determined to be correct. In particular, as with any form of speculation, the apparatus will be arranged so as to only commit an update to the architectural state once the associated speculation has been found to be correct. Accordingly, whilst the known result value can be determined immediately based on the predicted source operand value, it is appropriate not to commit that result value to the architectural state of the system until the predetermined source operand's value is determined to be correct.

For an in-order system, once the commit point is reached, the optimisation operation may cause the execution circuitry to write the known result value to the register determined from the destination register identifier, without the execution circuitry needing to execute the instruction. For an out-of-order system, it may not be necessary to perform any update to the register bank at that commit stage, and instead the register rename circuitry within the register rename stage 25 can be arranged to perform a remapping so that the architectural register identified by the destination register identifier of the chosen pending instruction is mapped to a physical register containing the known result value. Hence, whilst the architectural register identified by the destination register identifier for the chosen pending instruction may have initially been mapped to any arbitrary available physical register, once the optimisation condition has been detected then the register can perform a remapping so that that architectural register is instead mapped to a physical register that contains the known result value.

Whilst that remapping can only be committed once it is known that the predicted source operand value is correct, the optimisation analyser 40 can be arranged to cause the register rename stage to speculatively perform the remapping before the predicted source operand value is determined to be correct, and to then commit the remapping when the predicted source operand value has been determined to be correct. The register rename stage can maintain information about the speculative or committed nature of any mapping in a variety of ways. For example, it could maintain separate tables for any speculative mappings and committed mappings, or alternatively an additional field may be provided for each entry within the mapping table to identify whether the mapping is a speculative mapping or a committed mapping.

Figure 3:
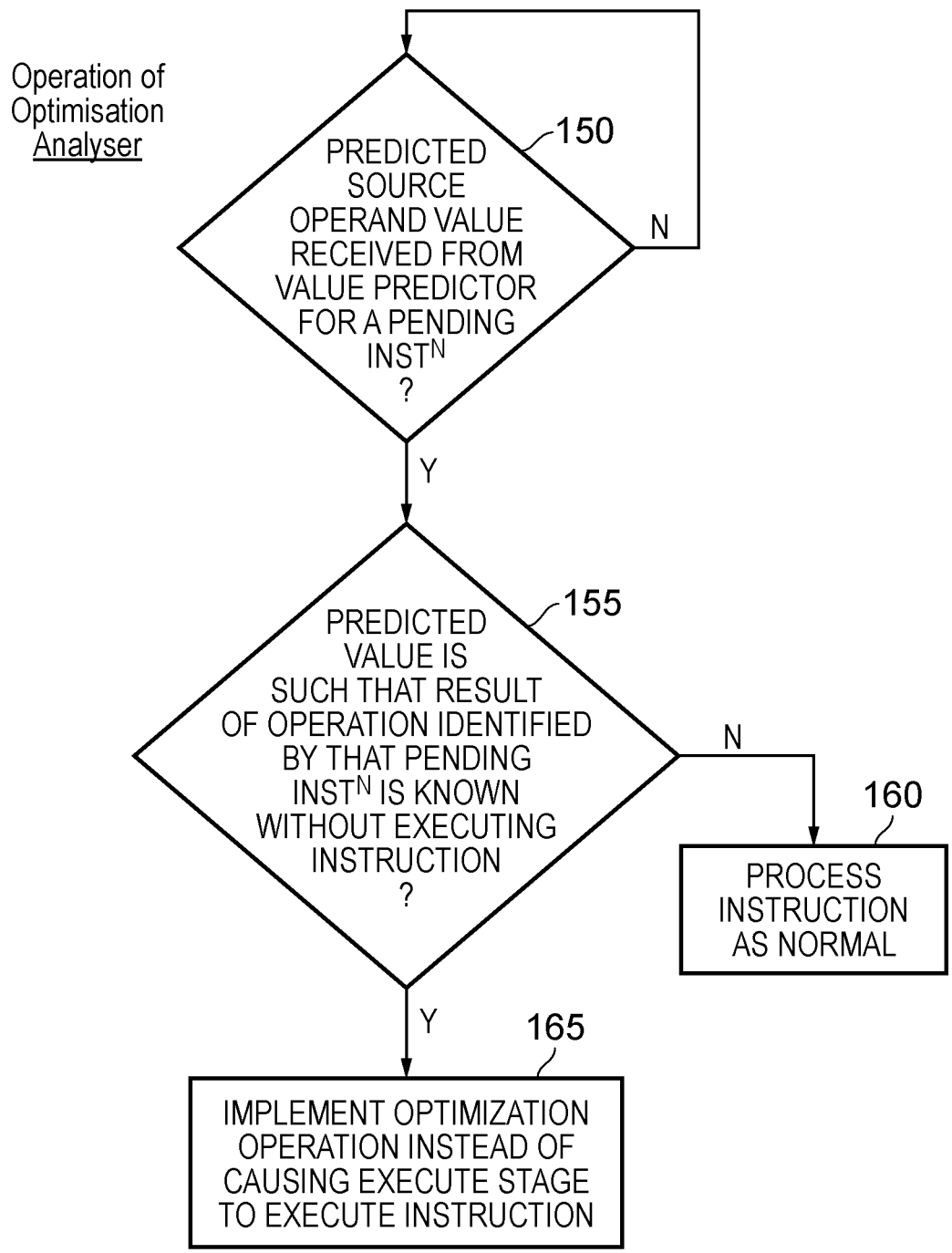
FIG. 3 is a flow diagram illustrating the operation of the optimisation analyser of FIG. 1 in one example arrangement.

FIG. 3 is a flow diagram illustrating the operation of the optimisation analyser 40 in one example arrangement. At step 150, it is determined whether a predicted source operand value has been received from the value predictor 60 for a particular pending instruction. If so, then at step 155 it is determined whether the predicted value is such that the result of the operation identified by that pending instruction is known without executing the instruction. There are many situations where this can be determined. For example, if the predicted value is 0 and the operation is a multiply operation multiplying that source operand value that is predicted as 0 with another source operand value, then it will be known that the result value is 0 assuming that the predicted value turns out to be correct.

If at step 155 it is determined, based on the predicted value and the type of operation to be performed, that the result value is not known, then the process proceeds to step 160 where the instruction is processed as normal. In particular, it may be possible to issue the instruction to the execute stage 45 earlier than would otherwise be possible due to the provision of the predicted source operand value, but no assumption is made about the result value, and instead the instruction is at that point executed by the execute stage 45 in order to produce a result value.

However, if at step 155 it is determined, based on the predicted source operand value and the required operation, that the result value is known without executing instruction, then at step 165 an optimisation operation is implemented instead of causing the execute stage to execute the instruction.

Figure 4:
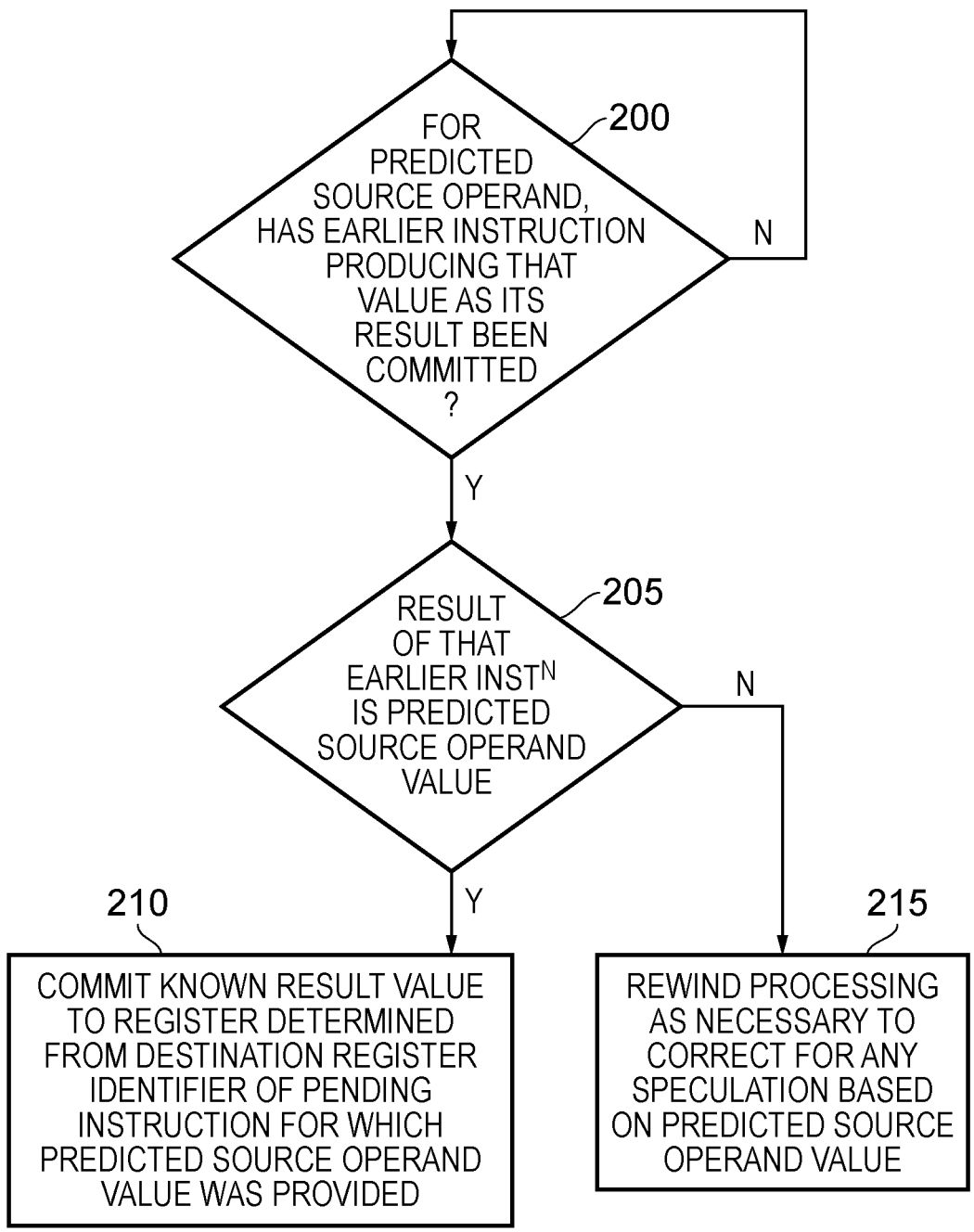
FIG. 4 is a flow diagram illustrating steps that can be performed in order to implement the optimisation operation of step 165 of FIG. 3, in accordance with one example arrangement.

FIG. 4 is a flow diagram illustrating the performance of the optimisation operation during step 165 of FIG. 3, in accordance with one example implementation. At step 200, it is determined whether, for the predicted source operand, any earlier instruction that will produce that required value as its result value has been committed, i.e. the produced result has been used to update the architectural state of the apparatus, either by writing to the appropriate register in the register bank or by committing a particular mapping to the register rename table.

When it is determined that the earlier instruction producing that value as its result has been committed, then at step 205 it is determined whether the result of that earlier instruction is the same as the predicted source operand value. If not, then the process proceeds to step 215 where the processing performed by the apparatus of FIG. 1 is rewound as necessary to correct for any speculation based on the predicted source operand value. In particular, it will be necessary to flush from the pipeline any instructions that were performing processing in dependence on the predicted source operand value, and instead to return the state of the processing pipeline to a point prior to the predicted source operand value being used, with the affected instructions then being re-executed based on the actual source operand value.

However, if at step 205 it is determined that the result of that earlier instruction is the predicted source operand value, then at step 210 the known result value can be committed to the register determined from the destination register identifier of the instruction using the predicted source operand value.

The steps discussed above with reference to FIGS. 3 and 4 can be performed irrespective of the form of the processing pipeline, and in particular can be performed irrespective of whether the pipeline implements in-order processing of instructions or out-of-order processing of instructions.

There are a number of ways in which the known result value can be committed at step 210 of FIG. 4. FIG. 5A illustrates one example approach that may be used for example within an in-order processing system. In particular, at step 220, the implementation of the optimisation operation may involve causing the execute stage 45 to write the known result value to a register within the register bank 50 identified by the destination register identifier, without the execute stage actually executing the instruction. In particular, the known result value can be provided directly to the execute stage along with an indication of the register into which the result value should be written.

FIG. 5B illustrates an approach that can be used to commit the known result value at step 210 of FIG. 4, for example in an out-of-order system. In particular, at step 225, implementation of the optimisation operation can be used to cause the register rename circuitry within the register rename stage 25 to perform a remapping so that the architectural register identified by the destination register identifier for the instruction that has used the predicted source operand value is mapped to a physical register that contains the known result value. By performing such a remapping, this can remove the need to perform any actual update to any physical registers in the register bank 50 in order to implement step 210 of FIG. 4.

Figure 6:
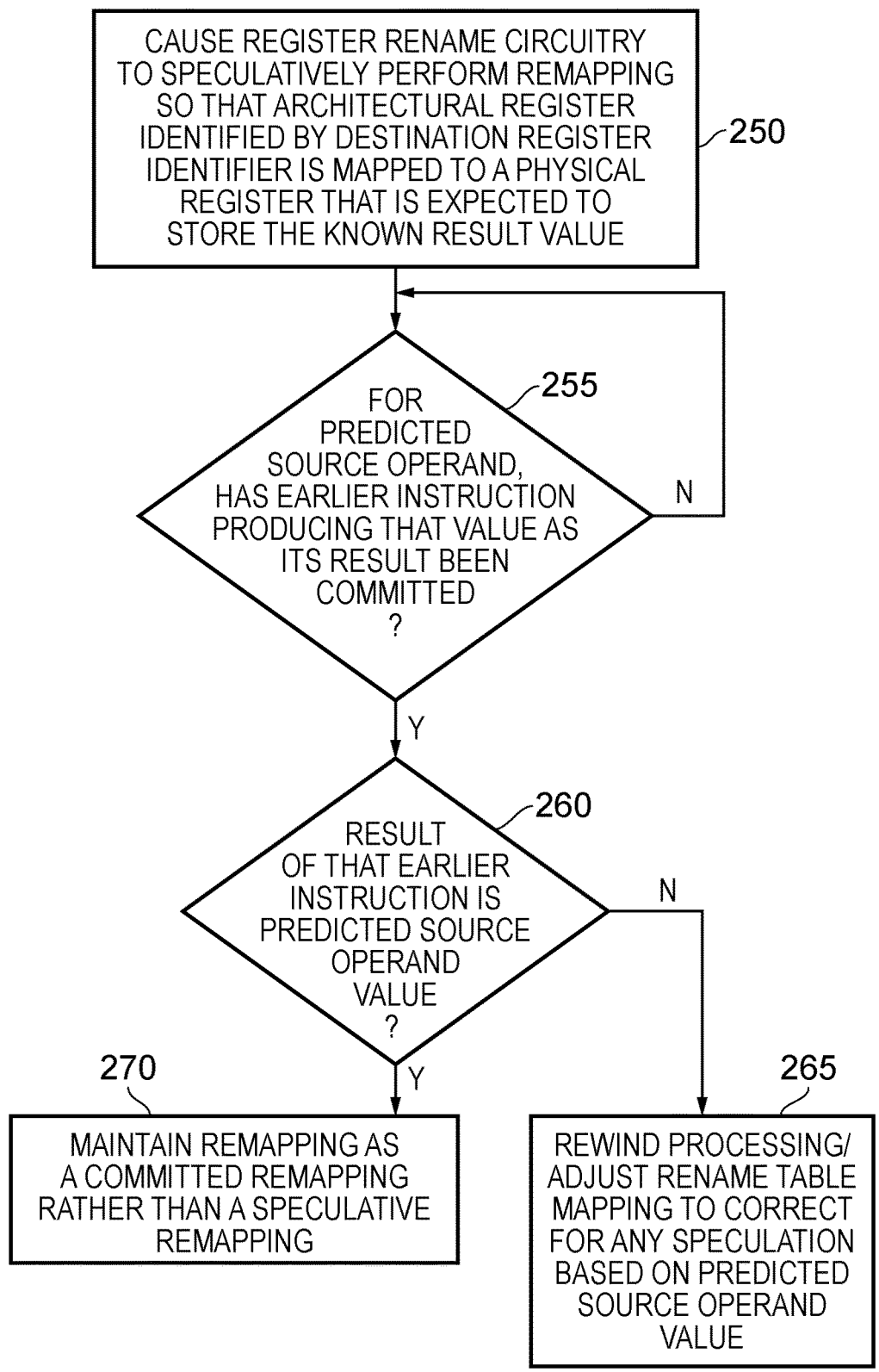
FIG. 6 is a flow diagram illustrating an alternative sequence of steps that may be performed in one example arrangement to implement the optimisation operation of step 165 of FIG. 3.

As mentioned earlier, whilst the above described remapping that can be performed within the register rename circuitry in the presence of the optimisation condition can only be committed once it has been determined that the predicted source operand is correct, additional performance improvements can be realised by speculatively performing the remapping before the predicted source operand value is determined to be correct. FIG. 6 illustrates one example implementation of such an optimisation operation. In particular, the process of FIG. 6 can be used instead of the process of FIG. 4 in order to implement step 165 of FIG. 3.

At step 250, the register rename circuitry is caused to speculatively perform remapping so that the architectural register identified by the destination register identifier of the instruction that has used the predicted source operand value is mapped to a physical register that is expected to store the known result value. At this stage, it may be the case that the physical register in question has not yet been populated with the result value. Purely by way of example, if we consider a multiply instruction that specifies architectural source operand registers R3 and R7, with the result being written into architectural destination register R1, and we assume that for the sake of illustration that the source register R3 is mapped to the physical register P40 by the register rename circuitry, then if a predicted source operand value for R3 is output by the value prediction circuitry 60, and in particular predicts that that source operand value is 0, then in combination with the knowledge that the instruction is specifying a multiply operation, it will be known that the result value to be written into the register R1 is also 0. Accordingly, the speculative remapping performed at step 250 can remap the architectural register R1 to the physical register P40. It can do this irrespective of whether or not an earlier instruction that is writing to the register R3 has yet finished execution.

Then, at step 255, for the predicted source operand, it is determined whether the earlier instruction that is producing that value as its result has been committed. Once this is true, then the process proceeds to step 260 where it is determined whether the result of that earlier instruction is the same as the predicted source operand value. If not, the process proceeds to step 265 where the processing performed by the processing pipeline of FIG. 1 is rewound to correct for any speculation based on the predicted source operand value, and in addition any necessary adjustments are made to the rename table mappings. In particular, with reference to the earlier discussed step 250, it may be determined that the speculative remapping that had been performed is not appropriate, and instead the architectural register in question may be mapped to a different arbitrary available physical register.

If the result of the earlier instruction is determined to be the same as the predicted source operand value at step 260, then the process proceeds to step 270 where the speculative remapping performed at step 250 is maintained as a committed remapping, thereby updating the architectural state of the system.

Figure 7:
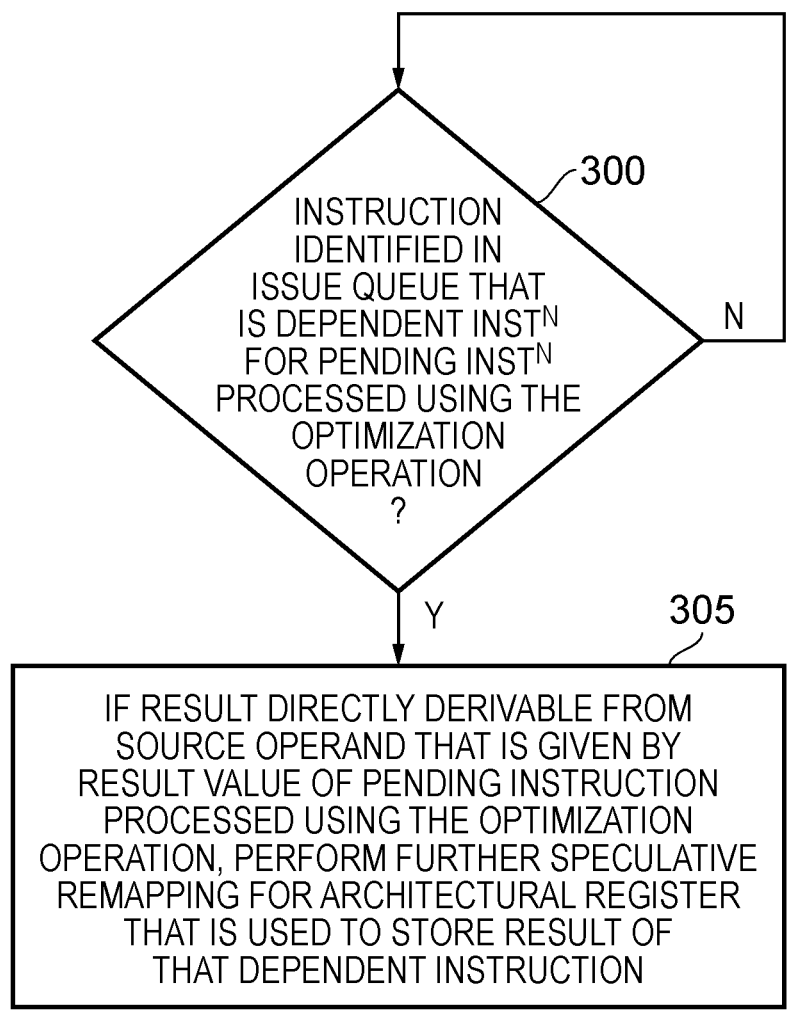
FIG. 7 is a flow diagram illustrating a further optimisation that can be implemented in addition to the final step of FIG. 3, in one example arrangement.

In addition to the optimisation operation performed at step 165 of FIG. 3 in association with a particular pending instruction for which the predicted source operand value was used, further levels of optimisation may also be performed in some instances in respect of certain dependent instructions, as for example illustrated by the process of FIG. 7. At step 300, the issue stage 30 can be arranged to review the instructions in the issue queue 35 to identify whether there is a dependent instruction for the instruction that is to be processed using the optimisation operation discussed earlier, i.e. whether there is a dependent instruction for a pending instruction whose result value is known without executing that pending instruction. Then, at step 305, for any such dependent instruction, if the result for that dependent instruction is directly derivable from a source operand of that dependent instruction that is given by the result value of the pending instruction processed using the optimisation operation, then an additional speculative remapping can be performed for the architectural register that is used to store the result of that dependent instruction.

By way of specific example, considering the following two instructions:

MUL R1, R3, R4
MOV R5, R1

The first, multiply, instruction is used to multiply the values in the architectural registers R3 and R4, with the result being stored in R1. The subsequent move instruction then moves the contents of register R1 into the register R5.

If for the multiply instruction, a predicted source operand value of 0 is given for the register R3, then this is detected by the optimisation analyser 40 as giving rise to presence of the optimisation condition, since it is known that if that predicted source operand value is correct, the result value to be stored in the register R1 will be 0. The speculative remapping that may be performed at step 250 of FIG. 6 would in that instance remap the architectural register R1 to the same physical register that is associated with the architectural register R3, which for the sake of illustration let's assume is the physical register P40. Then, for the subsequent move instruction, it is noted that this is a dependent instruction, since its source operand is the architectural register R1. It is also determined that the result is directly derivable from that source operand, in this case it being identical to the source operand. Accordingly, a further speculative remapping can be performed to remap the architectural register R5 to the physical register associated with R1, which given the above remapping is now physical register P40. Hence, at this point each of the registers R3, R1 and R5 are mapped to the physical register P40. Provided in due course it transpires that the earlier instruction that produces the value to be associated with the source register R3 does in fact produce a value of 0, then this will mean that a value of 0 will be stored in the physical register P40, and that the above two speculative remappings of the registers R1 and R5 can now be committed, without any need to separately execute the multiply instruction or the move instruction. It will hence be appreciated that the optimisation techniques described herein can give rise to significant performance improvements in certain situations.

FIGS. 8A to 8D illustrate certain example scenarios where the optimisation technique discussed earlier can be used. FIG. 8A shows a multiply instruction, and in this instance it is assumed that the value prediction circuitry 60 predicts that the source operand value for the architectural register R3 is 0. Accordingly, based on the earlier described optimisation technique, this allows the architectural register R1 to be mapped to 0, and for that mapping to be committed once it is known that the contents of R3 are in fact 0.

FIG. 8B illustrates an add or subtract example, and again it is predicted that the source operand value associated with the architectural register R3 is 0. In this case, the architectural register R1 can be mapped to the architectural register R2. For the register rename example implementation discussed earlier, this will involve mapping the physical register associated with the architectural register R1 to be the same physical register that is associated with the architectural register R2. That mapping can be committed once the architectural register R3 is known to be 0.

FIG. 8C illustrates a multiply-accumulate instruction. In accordance with this encoding, the registers R2 and R3 provide source operand values that are to be multiplied together in order to produce an intermediate result, with that intermediate result then being added to the current accumulate value in the register R1 in order to produce a result value that is then written back to the register R1. In this illustrated example, it is assumed that the value prediction circuitry 60 predicts that the value associated with the architectural register R2 is 0. This implies that no update to the contents associated with the architectural register R1 are needed, and this can be confirmed once it is known that the content of R2 is 0.

FIG. 8D illustrates a multiply example, where the values in the registers R2 and R4 are multiplied together in order to produce a result that is written into the register R1. In this instance, it is assumed that the value prediction circuitry predicts that the value associated with register R2 is 1. With this information, it is then known that the result to be written into R1 will be the value stored in R4, and accordingly R1 will be mapped to R4, with that mapping being committed once the value in R2 is known to be 1.

Figure 9:
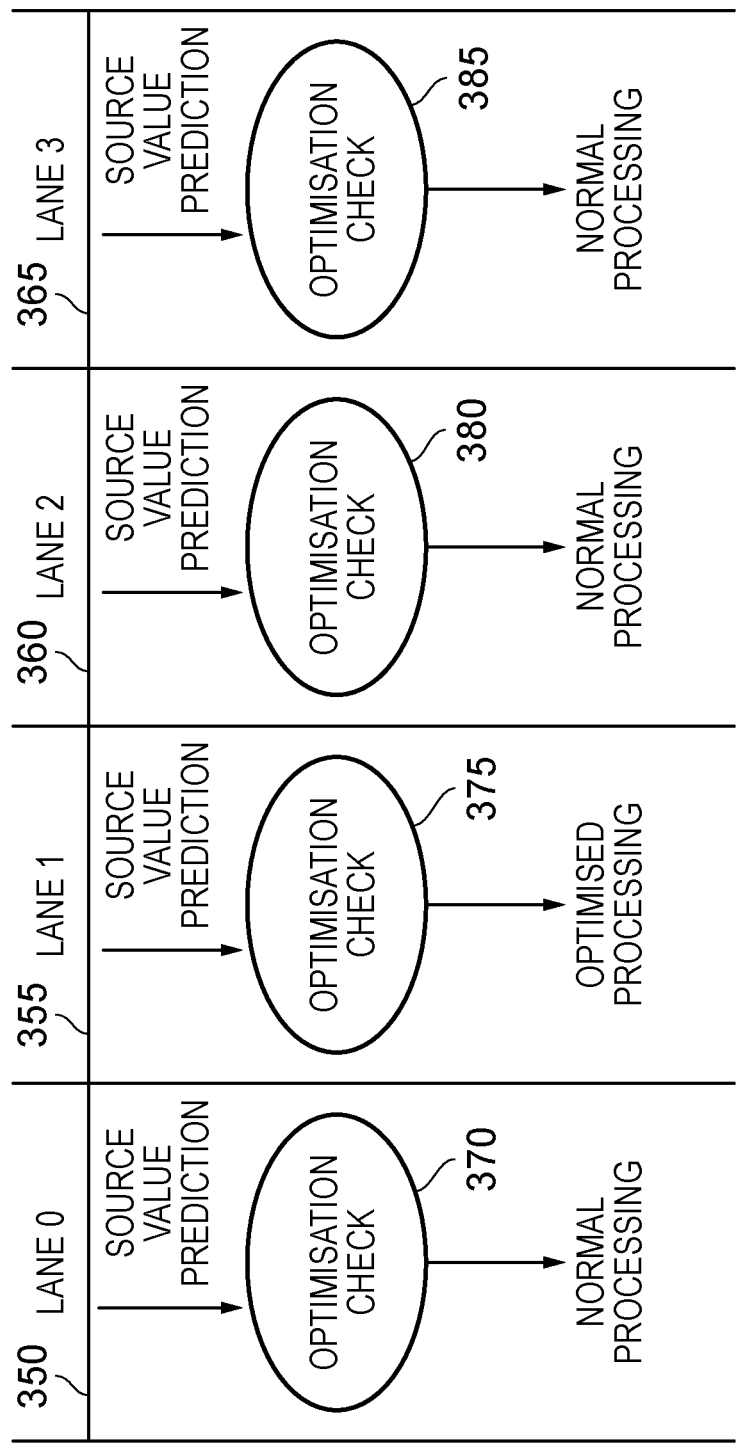
FIG. 9 illustrates a vector processing implementation where the optimisation techniques described herein can be applied independently within the different lanes of parallel processing.

As discussed earlier, the above described optimisation techniques can be employed in both in-order and out-of-order systems. Further, they can be employed in scalar systems, or in vector processing systems where processing operations are performed in parallel in multiple lanes of processing, with each lane receiving a particular data element from a vector of data elements forming each source operand. As illustrated in FIG. 9, the above described optimisation technique can be implemented independently in each of the lanes of parallel processing. In the example of FIG. 9, four lanes of parallel processing 350, 355, 360, 365 are shown, and source value prediction is performed in respect of the source data elements used in each of the respective lanes. Based on that source value prediction, an optimisation check 370, 375, 380, 385 can be performed independently by the optimisation analyser 40 for each of the lanes, enabling the above described optimised processing to be performed on a lane-by-lane basis dependent on whether the optimisation condition is detected for that lane. This can give rise to power consumption savings when performing vector processing operations by enabling the processing in one or more lanes to be turned off since within such lanes the result value is known without performing the data processing operation.

From the above described examples, it will be appreciated that the techniques described herein enable additional performance benefits to be realised in microarchitectures that employ value prediction schemes. In particular, the value prediction not only enables certain source operand values to become available earlier than might otherwise be the case, but in addition, when the predicted source operand value is a particular value which, in combination with the operation required by the relevant pending instruction, means that the result value is known without performing the operation, then it is possible to use that information to avoid execution of the instruction. Further, knowledge of the result value can be used to allow further speculation in respect of dependent instructions that may use that result value as a source operand.

Whilst it could in principle be possible to detect the optimisation condition based on actual source operand values and the associated operation for the chosen pending instruction, the performance benefits that would be achievable would typically be limited, since many source operand values are actually created by nearby instructions within the instruction stream. However, by using predicted source operand values, such a dependency on earlier instruction execution is no longer required. In particular, the predicted source operand value may be available significantly ahead of the actual source operand value, and hence the above described techniques enable the optimisation condition to be detected at an early stage, significantly increasing the performance benefits that can be realised.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   execution circuitry to execute instructions, each instruction requiring an associated operation to be performed using one or more source operand values in order to produce a result value;
   issue circuitry to maintain a record of pending instructions awaiting execution by the execution circuitry;
   prediction circuitry to produce a predicted source operand value for a chosen pending instruction, wherein the associated operation required by the chosen pending instruction comprises an arithmetic operation performed using a plurality of source operand values, including the predicted source operand value, in order to produce the result value; and
   optimization circuitry to detect an optimization condition for the chosen pending instruction when the predicted source operand value is a predetermined value such that, having regard to the associated operation for the chosen pending instruction, the result value is known without performing the associated operation;
   wherein the optimization circuitry is arranged in response to detection of the optimization condition to implement an optimization operation instead of causing the execution circuitry to perform the associated operation in order to execute the chosen pending instruction.

2. An apparatus as claimed in claim 1, wherein the chosen pending instruction provides a destination register identifier, and the optimization operation comprises committing the known result value to a register determined from the destination register identifier once the predicted source operand value is determined to be correct.

3. An apparatus as claimed in claim 2, wherein:
each instruction is arranged to identify the one or more source operand values by providing associated source register identifiers;
the chosen pending instruction provides a source register identifier for the source operand value predicted by the prediction circuitry that is the destination register identifier for an earlier instruction in a sequence of instructions to be executed by the execution circuitry; and
the predicted source operand value for the chosen pending instruction is determined to be correct once the result value has been determined for the earlier instruction and matches the predicted source operand value.

4. An apparatus as claimed in claim 2, wherein the optimization circuitry is arranged to implement the optimization operation by causing the execution circuitry to write the known result value to the register determined from the destination register identifier.

5. An apparatus as claimed in claim 2, wherein the apparatus supports speculative execution of the instructions by the execute circuitry out-of-order with respect to original program order of the instructions, further comprising:
register rename circuitry to map architectural registers identified by register identifiers in instructions to physical registers within a set of physical registers, where the number of physical registers exceeds the number of architectural registers; and
the optimization circuitry is arranged to implement the optimization operation by causing the register rename circuitry to perform a remapping so that the architectural register identified by the destination register identifier is mapped to a physical register containing the known result value.

6. An apparatus as claimed in claim 5, wherein the optimization circuitry is arranged to speculatively perform the remapping before the predicted source operand value is determined to be correct, and to then commit the remapping when the predicted source operand value has been determined to be correct.

7. An apparatus as claimed in claim 6, wherein the remapping is used to trigger a further optimization operation for at least one dependent instruction that uses as a source operand the result value for the chosen pending instruction.

8. An apparatus as claimed in claim 7, wherein the at least one dependent instruction is a move instruction identifying as a source operand the result value for the chosen pending instruction, and the further optimization operation causes the register rename circuitry to perform a further remapping so that the architectural register identified by a destination register identifier for the move instruction is also mapped to the physical register containing the known result value.

9. An apparatus as claimed in claim 1, wherein the associated operation for the chosen pending instruction is such that the known result value is given by one of the source operand values when the predicted source operand value is the predetermined value.

10. An apparatus as claimed in claim 9, wherein the predetermined value is 0.

11. An apparatus as claimed in claim 10, wherein the chosen pending instruction is a multiply instruction and the known result value is zero when the predicted source operand value is zero.

12. An apparatus as claimed in claim 10, wherein:
the chosen pending instruction is a multiply-accumulate instruction, requiring first and second source operands to be multiplied together to form an intermediate result which is then added to an accumulate source operand;
the predicted source operand value is zero for one of the first and second source operands; and
the known result value is provided by the accumulate source operand.

13. An apparatus as claimed in claim 12, wherein:
the chosen pending instruction provides a destination register identifier, and the optimization operation comprises committing the known result value to a register determined from the destination register identifier once the predicted source operand value is determined to be correct;
the destination register identifier is also used as a source operand identifier for the accumulate source operand; and
the committing of the known result value to the register determined from the destination register identifier comprises leaving content of that register unchanged.

14. An apparatus as claimed in claim 10, wherein:
the chosen pending instruction is an add or subtract instruction operating on first and second operands;
the predicted source operand value is zero for one of the first and second operands; and
the known result value is determined from the value of the other one of the first and second operands.

15. An apparatus as claimed in claim 9, wherein the predetermined value is 1.

16. An apparatus as claimed in claim 15, wherein:
the chosen pending instruction is a multiply instruction operating on first and second operands;
the predicted source operand value is 1 for one of the first and second operands; and
the known result value is given by the value of the other one of the first and second operands.

17. An apparatus as claimed in claim 1, wherein:
the optimization circuitry is further arranged to identify a dependent instruction in the issue queue that uses as a source operand the result value for the chosen pending instruction, and to identify as that source operand the known result value such that the issue circuitry considers that source operand to be available for the dependent instruction.

18. An apparatus as claimed in claim 1, wherein the execute circuitry is arranged to perform vector processing operations in a plurality of lanes of parallel processing, and the optimization circuitry is arranged to assess presence of the optimization condition for each lane, so as to enable the optimization operation to be applied for any lane where the predicted source operand value for that lane is such that, having regard to the associated operation for the chosen pending instruction, the result value for that lane is known without performing the associated operation.

19. A method of processing instructions comprising:
providing execution circuitry to execute the instructions, each instruction requiring an associated operation to be performed using one or more source operand values in order to produce a result value;
maintaining a record of pending instructions awaiting execution by the execution circuitry;
employing prediction circuitry to produce a predicted source operand value for a chosen pending instruction, wherein the associated operation required by the chosen pending instruction comprises an arithmetic data processing operation performed using a plurality of source operand values, including the predicted source operand value, in order to produce the result value;

detecting an optimization condition for the chosen pending instruction when the predicted source operand value is a predetermined value such that, having regard to the associated operation for the chosen pending instruction, the result value is known without performing the associated operation; and in response to detection of the optimization condition, implementing an optimization operation instead of causing the execution circuitry to perform the associated operation in order to execute the chosen pending instruction.

20. An apparatus comprising:

execution means for executing instructions, each instruction requiring an associated operation to be performed using one or more source operand values in order to produce a result value;

issue means for maintaining a record of pending instructions awaiting execution by the execution means;

prediction means for producing a predicted source operand value for a chosen pending instruction, wherein the associated operation required by the chosen pending instruction comprises an arithmetic operation performed using a plurality of source operand values, including the predicted source operand value, in order to produce the result value; and optimization means for detecting an optimization condition for the chosen pending instruction when the predicted source operand value is a predetermined value such that, having regard to the associated operation for the chosen pending instruction, the result value is known without performing the associated operation;

wherein the optimization means is arranged in response to detection of the optimization condition to implement an optimization operation instead of causing the execution means to perform the associated operation in order to execute the chosen pending instruction.

* * * * *